United States Patent
Chen et al.

(10) Patent No.: US 11,108,478 B2
(45) Date of Patent: Aug. 31, 2021

(54) GEOGRAPHIC INFORMATION-BASED SIMULATION TEST SYSTEM FOR MEDIUM-HIGH FREQUENCY COMMUNICATION CHANNELS

(71) Applicant: SHANGHAI ADVANCED AVIONICS CO., LTD., Shanghai (CN)

(72) Inventors: Difei Chen, Shanghai (CN); Qiang Sun, Shanghai (CN); Yao Tang, Shanghai (CN)

(73) Assignee: SHANGHAI ADVANCED AVIONICS CO., LTD., Shanghai (CN)

( * ) Notice: Subject to any disclaimer, the term of this patent is extended or adjusted under 35 U.S.C. 154(b) by 0 days.

(21) Appl. No.: 16/771,390

(22) PCT Filed: Dec. 7, 2018

(86) PCT No.: PCT/CN2018/119660
§ 371 (c)(1),
(2) Date: Jun. 10, 2020

(87) PCT Pub. No.: WO2019/114612
PCT Pub. Date: Jun. 20, 2019

(65) Prior Publication Data
US 2020/0396013 A1    Dec. 17, 2020

(30) Foreign Application Priority Data

Dec. 11, 2017 (CN) .......................... 201711308372.0

(51) Int. Cl.
*H04B 17/391* (2015.01)
*H04B 17/00* (2015.01)
*G06F 16/29* (2019.01)

(52) U.S. Cl.
CPC ..... *H04B 17/3912* (2015.01); *H04B 17/0085* (2013.01); *G06F 16/29* (2019.01)

(58) Field of Classification Search
CPC .. H04B 17/3912; H04B 17/0085; G06F 16/29
(Continued)

(56) References Cited

U.S. PATENT DOCUMENTS

2003/0093187 A1* 5/2003 Walker ............... B64D 45/0059
701/1

FOREIGN PATENT DOCUMENTS

CN        103454524 A    12/2013
CN        104243070 A    12/2014
(Continued)

OTHER PUBLICATIONS

PCT/CN2018/119660 ISA210 ISR, dated Mar. 1, 2019.

*Primary Examiner* — Fitwi Y Hailegiorgis
(74) *Attorney, Agent, or Firm* — RatnerPrestia

(57) ABSTRACT

The present invention discloses a geographic information-based simulation test system for medium-high frequency communication channels, comprising a human-machine interface module, a geographic information processor, a ground wave signal simulation processing module, a sky wave signal simulation processing module, a digital map, an ambient noise generation module, a time generator, and an simulation signal synthesizer. A ground wave transmission signal and a sky wave transmission signal are respectively simulated according to a ground wave transmission path and a sky wave transmission path; and finally, the ground wave simulation signal, the sky wave simulation signal, and the ambient noise signal are synthesized and sent to a medium-high frequency receiver. By means of the geographic information-based simulation test system for medium-high frequency communication channels, the test cost of the medium-high frequency communication system and device can be reduced, the signals that may be actually received by the medium-high frequency receiver at any location in any period of a year can be simulated quickly, thereby greatly
(Continued)

increasing the test speed of the medium-high frequency communication system and device.

7 Claims, 1 Drawing Sheet

(58) Field of Classification Search
USPC .......................................................... 375/224
See application file for complete search history.

(56) References Cited

FOREIGN PATENT DOCUMENTS

| | | | |
|---|---|---|---|
| CN | 105763274 | A | 7/2016 |
| CN | 106253995 | A | 12/2016 |
| CN | 106656377 | A | 5/2017 |
| CN | 107453824 | A | 12/2017 |
| CN | 108039931 | A | 5/2018 |

* cited by examiner

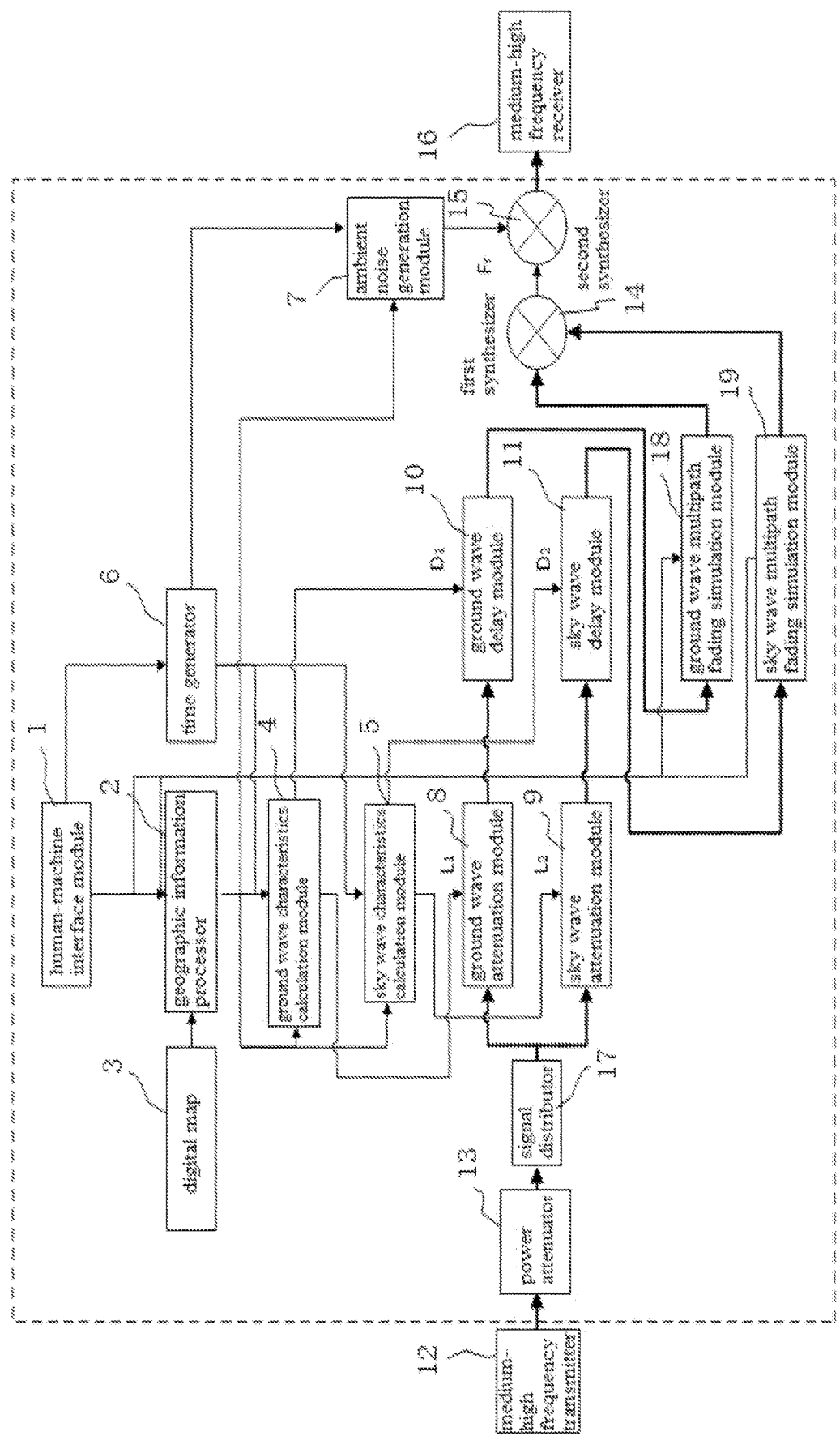

GEOGRAPHIC INFORMATION-BASED SIMULATION TEST SYSTEM FOR MEDIUM-HIGH FREQUENCY COMMUNICATION CHANNELS

TECHNICAL FIELD

The present invention relates to a simulation test system for communication channels, in particular relates to a geographic information-based simulation test system for medium-high frequency communication channels.

BACKGROUND

Medium-high frequency communication is an important means of long-distance communication. Medium frequency (also known as medium wave, MF) communication is mainly transmitted by ground wave, with a distance of up to hundreds of kilometers; while high frequency (also known as short wave, HF) communication is transmitted by sky wave and ground wave, that is, after the reflection of the ionosphere, the transmitted signal is sent to the long-distance receiving equipment, with a distance of up to thousands of kilometers.

The transmission mode of medium-high frequency communication system includes sky wave and ground wave. The transmission channel is an important part of medium-high frequency communication system. The characteristics of the transmission channel directly affect the performance of communication. Ground wave, that is to say, the surface wave propagates along the earth's surface. Its transmission is characterized by the change of topography. Sky wave propagation is a kind of propagation mode that the radio wave reaches the ground receiving point through the reflection of the high-altitude ionosphere. Because the ionosphere is a layered, uneven and time-varying medium, the sky wave channel belongs to the random variable parameter channel, which will change with the change of sunshine in a day and the change of seasons in a year. In addition, there is also radio noise in the geographical location of the receiver. The sources of this noise are as follows:

1) Radiation of lightning discharge (atmospheric noise caused by lightning);
2) Collective unintentional radiation caused by electrical machinery, electrical and electronic equipment, power transmission lines or external combustion engine ignition (human noise);
3) Emission of atmospheric gases and water images;
4) Ground or other obstacles in the antenna beam;
5) Radiation from celestial radio sources.

Atmospheric noise is the result of the natural electrical activity (thunderstorm) in the earth's atmosphere, which propagates over a long distance. The level of this noise largely depends on the season of the year, the time of the day and the geographical location of the receiver.

It can be seen from the above that the medium and high frequency transmission channels have high complexity and randomness. In the development of medium and high frequency communication equipment and system, in order to test the performance of communication equipment, we have to build a long-distance communication test system. The distance between the transmitter and the receiver can reach hundreds or even thousands of kilometers. It needs a lot of manpower, material and financial resources to test in the real environment for a long time, and it cannot guarantee that the channel conditions fully cover the actual application, nor can the channel parameters be changed artificially.

The existing wireless channel simulator can simulate several common channel characteristics in the laboratory, including path loss, shadow fading, Doppler effect and multipath fading, which cannot meet the requirements of the simulation test of medium and high frequency communication transmission channel. The main disadvantages include:

1) Geographical location of transmitter and receiver is not considered;
2) The transmission path between transmitter and receiver, and the influence of land, lake, ocean and other different paths on ground wave transmission are not considered;
3) The type of ionosphere and the influence of ionosphere on the signal and the variation of ionosphere with time are not considered;
4) Environmental radio noise changes with time, season and geographical location are not considered.

In order to solve the big difference between the simulation test of the medium and high frequency communication channel and the actual use environment, and to consider less about the ground wave and sky wave transmission channel, it is necessary to provide a simulation test system of the medium and high frequency communication channel based on geographic information, which can be used for the simulation, simulation and channel simulator development of the medium and high frequency communication channel.

SUMMARY

The technical problem to be solved by the present invention is to provide a geographic information-based simulation test system for medium-high frequency communication channels, which can reduce the test cost of the medium-high frequency communication systems and equipment, and quickly simulate the signal may actually be received by the medium-high frequency receiver in any time of year in any place, greatly improves the test speed of the medium-high frequency communication systems and equipment.

The technical problem to be solved by the present invention is to provide a geographic information-based simulation test system for medium-high frequency communication channels, wherein comprising:

a human-machine interface module: inputting the frequency, geographical coordinates, time range, communication availability of a transmitter and a receiver, the modulation mode of the transmitter and the receiver, the output power of the transmitter, the antenna height of the transmitter, the antenna type of the transmitter, the antenna height of the receiver, the antenna type and channel multipath parameters of the receiver, and controlling the start and end of simulation process;

a geographic information processor: calculating the communication signal transmission path between the transmitter and the receiver, the transmission path includes a ground wave transmission path and a sky wave transmission path;

a ground wave characteristics calculation module: calculating the attenuation and time delay under the mixed path and controlling the variable power attenuator and time delay module to adjust the transmitted signal according to the information composition of ground characteristics of various ground wave transmission paths;

a ground wave multipath fading simulation module: carrying the multipath fading simulation of the signal output by the delay module to generate the ground wave transmission signal through the channel multipath parameters read by the human-machine interface module;

a sky wave characteristics calculation module: calculating the attenuation and time delay of the ionospheric reflection path and controlling the variable power attenuator and time delay module to adjust the transmitted signal according to the information composition of various sky wave transmission paths;

a sky wave multipath fading simulation module: carrying the multipath fading simulation of the signal output by the delay module to generate the sky wave transmission signal through the channel multipath parameters read by the human-machine interface module;

a digital map: storing global or regional geographic feature information for providing ground feature information to geographic information processors;

an ambient noise generation module: generating environment noise signal of receiver;

a time generator: controlling the time of the whole simulation system, the time generator reads the time range from the human-machine interface module, when the simulation is started, the time generator outputs the starting time to the geographic information processor, the ground wave signal simulation processing module, the sky wave signal simulation processing module and the ambient noise generation module, and continuously updating the time until the end;

a simulation signal synthesizer: synthesizing the ground wave transmission signal, sky wave transmission signal and environmental noise signal generated by simulation.

The geographic information-based simulation test system for medium-high frequency communication channels, wherein for the ground wave transmission path, the geographic information processor reads the digital map, extracts the ground characteristic information of the transmission path, and outputs it to the ground wave signal simulation processing module, the ground characteristic information includes low salt sea water, average salt sea water, fresh water, wetland surface, medium dry ground, dry ground, very dry ground and fresh water ice.

The geographic information-based simulation test system for medium-high frequency communication channels, wherein for the sky wave transmission path, the geographic information processor reads the digital map, extracts the sky wave transmission path information, and outputs it to the sky wave signal simulation processing module the sky wave transmission path information includes geomagnetic, ocean, ionosphere type and height information.

The geographic information-based simulation test system for medium-high frequency communication channels, wherein the variable power attenuator in the ground wave signal simulation processing module and the sky wave signal simulation processing module is connected with the medium-high frequency transmitter through the power attenuator, the high-power radio signal output by the medium-high frequency transmitter is attenuated to the small-power radio signal, and then the attenuation of the simulation transmission signal is controlled through the variable power attenuator after the attenuation of the power attenuator is deducted.

The geographic information-based simulation test system for medium-high frequency communication channels, wherein the simulation signal synthesizer includes a first synthesizer and a second synthesizer, the first synthesizer performs signal vector synthesis of the simulation ground wave transmission signal and the simulation sky wave transmission signal outputted by the multipath fading, and the second synthesizer perform simulation synthesis of the signal outputted by the first synthesizer and the environment noise signal outputted by the environment noise generating module and then sends them to the medium-high frequency receiver.

The geographic information-based simulation test system for medium-high frequency communication channels, wherein the human-machine interface module also inputs simulation speed parameters, which represent the ratio of simulation system time and simulation time, the time generator continuously updates the time according to the simulation speed until the end time or receives the end command.

The geographic information-based simulation test system for medium-high frequency communication channel, wherein the ambient noise generation module calculates the median external noise factor according to the receiver antenna type, position coordinates, and time range parameters.

Compared with the prior art, the beneficial effects of the present invention are as follows: the geographic information-based simulation test system for medium-high frequency communication channels can reduce the test cost of the medium-high frequency communication systems and equipment, and quickly simulate the signal may actually be received by the medium-high frequency receiver in any time of year in any place, greatly improves the test speed of the medium-high frequency communication systems and equipment by simulating signals that may be actually received by the medium-high frequency receivers at different geographic locations and in different time periods.

BRIEF DESCRIPTION OF FIGURES

FIG. 1 is a structure schematic diagram of a geographic information-based simulation test system for medium-high frequency communication channels according to the present invention.

DETAILED DESCRIPTION

The invention will now be further described below with reference to the accompanying drawings and examples.

FIG. 1 is a structure schematic diagram of a geographic information-based simulation test system for medium-high frequency communication channels according to the present invention.

Please refer to FIG. 1, the geographic information-based simulation test system for medium-high frequency communication channels comprising:

a human-machine interface module: inputting the frequency, geographical coordinates, time range, communication availability (90% or 95%) of a transmitter and a receiver, the modulation mode of the transmitter and the receiver, the output power of the transmitter, the antenna height of the transmitter, the antenna type of the transmitter, the antenna height of the receiver, the antenna type and channel multipath parameters of the receiver, and controlling the start and end of simulation process. Channel multipath parameters include parameters such as delay, gain, Doppler frequency, and Doppler spread of multiple paths;

a geographic information processor: calculating the communication signal transmission path between the transmitter and the receiver, the transmission path includes a ground wave transmission path and a sky wave transmission path;

a ground wave characteristics calculation module: calculating the attenuation and time delay under the mixed path and controlling the variable power attenuator and time delay module to adjust the transmitted signal according to the information composition of ground characteristics of various ground wave transmission paths;

a ground wave attenuation module: using variable power attenuator;

a ground wave delay module: using variable radio frequency signal delay;

a ground wave multipath fading simulation module: carrying the multipath fading simulation of the signal output by the delay module to generate the ground wave transmission signal through the channel multipath parameters read by the human-machine interface module;

a sky wave characteristics calculation module: calculating the attenuation and delay in mixed paths and controlling the variable power attenuator and time delay module to adjust the transmitted signal according to the information composition of various sky wave transmission paths;

a ground wave attenuation module: as the ground wave attenuation module, using variable power attenuator;

a sky wave delay module: as the ground wave delay module, using variable radio frequency signal delay;

a sky wave multipath fading simulation module: as the ground wave multipath fading simulation module, generating the ground wave transmission signal;

a digital map: storing global or regional geographic feature information for providing ground feature information to geographic information processors;

an ambient noise generation module: generating environment noise signal of receiver;

a time generator: controlling the time of the whole simulation system, the time generator reads the time range from the human-machine interface module, when the simulation is started, the time generator outputs the starting time to the geographic information processor, the ground wave characteristics calculation module, the sky wave characteristics calculation module and the ambient noise generation module, and continuously updating the time until the end;

a simulation signal synthesizer: synthesizing the ground wave transmission signal, sky wave transmission signal and environmental noise signal generated by simulation.

The present invention calculate the transmission characteristics of ground wave and sky wave and the environmental noise of the receiver according to the signal characteristics of the medium-high frequency transmitter and receiver, the actual working geographical position and time range and other parameters. These parameters include the frequency of the input transmitter and receiver, the modulation mode, the output power of the transmitter, the antenna height of the transmitter, the antenna type of the transmitter, the antenna height of the receiver and the antenna type of the receiver, position coordinate, time range, channel multipath and other parameters. Controlling the work of the medium-high frequency channel simulator, simulating the signals that the receiver may actually receive in different geographical locations and different time periods according to the calculation results. The functions and realization of each main module are as follows:

A human-machine interface module 1: inputting the frequency, the modulation mode of the transmitter and the receiver, the output power of the transmitter, the antenna height of the transmitter, the antenna type of the transmitter, the antenna height of the receiver, the antenna type, position coordinates, time range and of the receiver, channel multipath of the receiver and other parameters. The human-machine interface module has the function of starting and ending simulation, and can control the speed of simulation. The human-machine interface module can be a computer, tablet computer or other input device.

A geographic information processor 2: calculating the communication signal transmission path between the transmitter and the receiver, the transmission path includes a ground wave transmission path and a sky wave transmission path. For the ground wave transmission path, the geographic information processor reads the digital map, extracts the information of the ground characteristics of the transmission path, such as low salt sea water, average salt sea water, fresh water, wetland surface, medium dry ground, dry ground, very dry ground, fresh water ice, etc., and outputs it to the ground wave characteristics calculation module. For the sky wave transmission path, the geographic information processor reads the digital map, extracts the geomagnetic, oceanic, ionospheric type and height information of the transmission path, and outputs them to the sky wave characteristics calculation module.

A digital map 3: storing global or regional geographic feature information for providing ground feature information to geographic information processors;

A ground wave characteristics calculation module 4: the attenuation L1 and time delay D1 under the mixed path composed of the information of the ground characteristics of the various ground wave transmission paths described in the geographic information processor 2 are calculated. The calculation of ground wave transmission mainly refers to the calculation method proposed in ITU-R p.368-9 proposal "ground wave propagation curve with frequency between 10 kHz and 30 MHz". The standard recommends the use of computer program GRWAVE to calculate the transmission curve. The computer program GRWAVE can only calculate a single ground characteristic, that is, the conductivity and relative permittivity remain unchanged, the actual transmission route is a mixed path, and the conductivity and relative permittivity change. The ground wave feature calculation module first automatically calculates the length of each path with the same ground feature under the mixed path, then calculates the attenuation and delay according to the conductivity and relative dielectric constant of each same ground feature, and finally comprehensively calculates the overall attenuation and delay under the mixed path.

A sky wave characteristics calculation module 5: the attenuation L2 and the delay D2 under the mixed path composed of the information of the various sky wave transmission paths described in the geographic information processor 2 are calculated. For the medium wave signal with frequency less than 1700 kHz, the sky wave transmission with path length between 50 and 12000 km mainly refers to ITU-R p.1147-4 proposal "prediction of sky wave field strength with frequency between 150 and 1700 kHz". The difference lies in line gain factor, ocean gain, hourly loss factor, loss factor of comprehensive influence of solar activity, daily and short-term changes of field strength at night, coupling loss of over polarization, etc., which are improved from reading curve to fitting curve, automatic calculation by computer, and reading map of magnetic declination angle and magnetic inclination angle to automatic acquisition from digital map 3. For the prediction of sky wave propagation with frequency between 2-30 mhz, it mainly refers to ITU-R p.533-13 proposal prediction method of HF circuit performance. The difference is that the chart in the proposal is fitted so that the calculation is completed automatically.

A time generator 6: controlling the time of the whole simulation system, the time generator reads the time range from the human-machine interface module. The input format of time range is start time: "month-day-hour", end time: "month-day-hour". The minimum simulation range is a few hours of the specified month and date, and the maximum simulation range is a whole year. The time generator reads the simulation speed parameter K from the human-machine interface, which represents the ratio of simulation system time and simulation time, that is, k=simulation system time/simulation time. When k=60, it means that one minute of operation of the simulation system is equivalent to one hour of simulation. When the simulation is started, the time generator outputs the starting time "month-day-hour" to the ground wave characteristics calculation module, the sky wave characteristics calculation module and the environment noise generation module, and updates the "month-day-hour" continuously and continuously according to the simulation speed until the end time or receiving the end instruction.

An ambient noise generation module 7: used to generate environmental noise at the receiver. The ambient noise generation module obtains parameters such as receiver position coordinates, communication availability (90% or 95%) and time range from the human-machine interface. According to Recommendation ITU R P.372, the ITU NOISEDAT software is called to calculate the parameters of the external noise factor median $F_{am}$ and the high decile $D_u$ from the median.

For the external noise factor corresponding to the required availability, the upper bound $F_a$ should be calculated using equation (1):

$$F_a = F_{am} + \sqrt{D_t^2 + D_s^2} \text{ dB above } k\ T_0 B \text{ [V]} \quad (1)$$

wherein:
$F_{am}$: median external noise factor
$D_s$: the expected signal level change for the required percentage of time is equivalent to a 3 dB factor specified by IMO as the fading margin
$D_t$: the expected change in noise level for the required percentage of time.
If the communication availability is 90%, then $D_t = D_u$;
If the communication availability is 95%, then $D_t = D_u + 3$;
K: Boltzmann constant=$1.38 \times 10^{-23}$ J/K;
$T_0$: reference temperature (K) is 290 K;
B: receive noise 1 Hz power bandwidth (Hz);

The ambient noise generation module 7 finally generates the environmental noise Fr at the receiver.

The ground wave attenuation module 8 is a program-controlled variable power attenuator, which controls L1 from the ground wave characteristic calculation output. The sky wave attenuation module 9 is a program-controlled variable power attenuator, which controls L2 from the sky wave characteristic calculation output. The ground wave delay module 10 is a program-controlled radio frequency signal delay, which controls D1 from the ground wave characteristic calculation output. The sky wave delay module 11 is a program-controlled radio frequency signal delayer, which controls D2 from the sky wave characteristic calculation output.

The ground wave multipath fading simulation module 18 is a wireless multipath channel emulator, which controls the channel multipath parameters manually input from the human-machine interface module 1, and the channel multipath parameters include delay, gain, and Doppt frequencies of multiple paths, Doppler expansion and other parameters. The wireless multi-path channel emulator can be a dedicated wireless channel emulator device or a device based on a software radio platform.

The sky wave multipath fading simulation module 19 is also a wireless multipath channel emulator, which controls the channel multipath parameters manually input from the man-machine interface module 1.

The medium-high frequency transmitter 12 is an equipment to be tested, and outputs a medium and high frequency radio signal. The power attenuator 13 is a high-power attenuator, which is used to attenuate the high-power radio signal output by the medium-high frequency transmitter to a small power to avoid damage to the ground wave attenuation and sky wave attenuation modules. The signal distributor 17 is used to distinguish the sky wave transmission signal from the ground wave transmission signal. The attenuation of the power attenuator must be deducted for ground wave attenuation and sky wave attenuation. The first synthesizer 14 synthesizes the signal transmitted by the ground wave output by the ground wave multipath fading and the sky wave transmitted signal output by the sky wave multipath fading. The second synthesizer 15 synthesizes the signal output by the first synthesizer 14 and the receiver environmental noise Fr output by the environmental noise generation module 7. The medium-high frequency transmitter 12 is an equipment to be tested, and receives the signal output from the second synthesizer 15.

While the present invention has been disclosed as above in preferred embodiments, it is not intended to limit the invention. Any person skilled in the art may make various improvement and modifications within the spirit and scope of the invention. Therefore, the scope of protection of the invention shall be subject to that defined in the claims.

What is claimed is:
1. A geographic information-based simulation test system for medium-high frequency communication channels, comprising:
a human-machine interface module: inputting frequency, geographical coordinates, time range, communication availability of a medium-high frequency transmitter and a medium-high frequency receiver, a modulation mode of the medium-high frequency transmitter and the medium-high frequency receiver, an output power of the medium-high frequency transmitter, an antenna height of the medium-high frequency transmitter, an antenna type of the medium-high frequency transmitter, an antenna height of the medium-high frequency receiver, antenna type and channel multipath parameters of the medium-high frequency receiver, and controlling the time range including a start time and an end time of a simulation process;
a geographic information processor: calculating a communication signal transmission path between the medium-high frequency transmitter and the medium-high frequency receiver, the transmission path includes a ground wave transmission path and a sky wave transmission path;
a ground wave characteristics calculation module: calculating attenuation and time delay under a mixed path and controlling a variable power attenuator and a time delay module to adjust a transmitted signal according to information composition of ground characteristics of various ground wave transmission paths;
a ground wave multipath fading simulation module: carrying a multipath fading simulation of a signal output by the time delay module to generate a ground wave transmission signal through the channel multipath parameters read by the human-machine interface module;
a sky wave characteristics calculation module: calculating attenuation and time delay of an ionospheric reflection path and controlling a variable power attenuator and a time delay module to adjust a transmitted signal according to information composition of various sky wave transmission paths;

a sky wave multipath fading simulation module: carrying multipath fading simulation of the signal output by the time delay module to generate a sky wave transmission signal through the channel multipath parameters read by the human-machine interface module;

a digital map: storing global or regional geographic feature information for providing ground feature information to the geographic information processor;

an ambient noise generation module: generating environment noise signal of the medium-high frequency receiver;

a time generator: controlling time of the simulation test system, the time generator reads the time range including the starting time and the end time from the human-machine interface module, when the simulation process is started, the time generator outputs the starting time to the geographic information processor, the ground wave characteristics calculation module, the sky wave signal characteristics calculation module and the ambient noise generation module, and continuously updating the time until the end time;

a simulation signal synthesizer: synthesizing the ground wave transmission signal, the sky wave transmission signal and the environmental noise signal generated by the simulation process.

2. The geographic information-based simulation test system for medium-high frequency communication channels according to claim 1, wherein for the ground wave transmission path, the geographic information processor reads the digital map, extracts ground characteristic information of the transmission path, and outputs it to the ground wave characteristics calculation module, and wherein the ground characteristic information includes low salt sea water, average salt sea water, fresh water, wetland surface, medium dry ground, dry ground, very dry ground and fresh water ice.

3. The geographic information-based simulation test system for medium-high frequency communication channels according to claim 1, wherein for the sky wave transmission path, the geographic information processor reads the digital map, extracts sky wave transmission path information, and outputs it to the sky wave characteristics calculation module, and wherein the sky wave transmission path information includes geomagnetic, ocean, ionosphere type and height information.

4. The geographic information-based simulation test system for medium-high frequency communication channels according to claim 1, wherein the variable power attenuator in the ground wave characteristics calculation module and the sky wave characteristics calculation module is connected with the medium-high frequency transmitter through a power attenuator, a high-power radio signal output by the medium-high frequency transmitter is attenuated to a small-power radio signal, and then attenuation of a simulation transmission signal is controlled through the variable power attenuator after attenuation of the power attenuator is deducted.

5. The geographic information-based simulation test system for medium-high frequency communication channels according to claim 4, wherein the simulation signal synthesizer includes a first synthesizer and a second synthesizer, the first synthesizer performs signal vector synthesis of a simulation ground wave transmission signal outputted by the ground wave multipath fading simulation module and a simulation sky wave transmission signal outputted by the sky wave multipath fading simulation module, and the second synthesizer perform simulation synthesis of the signal outputted by the first synthesizer and the environment noise signal outputted by the ambient noise generating module and then sends them to the medium-high frequency receiver.

6. The geographic information-based simulation test system for medium-high frequency communication channels according to claim 1, wherein the human-machine interface module also inputs simulation speed parameters, which represent a ratio of simulation test system time and simulation time, the time generator continuously updates the simulation time according to the simulation speed until the end time or receives an end command.

7. The geographic information-based simulation test system for medium-high frequency communication channels according to claim 1, wherein the ambient noise generation module calculates a median external noise factor according to the antenna type, the geographical coordinates, and the time range of the medium-high frequency receiver.

* * * * *